(12) United States Patent
Lee et al.

(10) Patent No.: US 11,525,891 B2
(45) Date of Patent: Dec. 13, 2022

(54) SYSTEM FOR IDENTIFYING VEHICLE USING LASER SENSOR

(71) Applicant: LG Electronics Inc., Seoul (KR)

(72) Inventors: See-Hyung Lee, Seoul (KR); Hyunsang Park, Seoul (KR)

(73) Assignee: LG Electronics Inc., Seoul (KR)

( * ) Notice: Subject to any disclaimer, the term of this patent is extended or adjusted under 35 U.S.C. 154(b) by 657 days.

(21) Appl. No.: 16/557,249

(22) Filed: Aug. 30, 2019

(65) Prior Publication Data

US 2019/0383905 A1 Dec. 19, 2019

(30) Foreign Application Priority Data

Jul. 8, 2019 (KR) .................. 10-2019-0082346

(51) Int. Cl.
*G01S 7/48* (2006.01)

(52) U.S. Cl.
CPC .................. *G01S 7/4802* (2013.01)

(58) Field of Classification Search
CPC ....... G01S 7/4802; G01S 13/06; G06V 20/58; G06V 10/255; G06T 2207/30261; G06T 2207/30252; G06T 7/70
See application file for complete search history.

(56) References Cited

U.S. PATENT DOCUMENTS

| 6,927,699 | B2 * | 8/2005 | Samukawa | G08G 1/166 340/436 |
| 7,496,449 | B2 * | 2/2009 | Samukawa | B60T 7/22 342/107 |
| 10,475,201 | B1 * | 11/2019 | Hall | H04N 5/2256 |
| 2005/0278098 | A1 * | 12/2005 | Breed | G01S 7/0235 701/45 |

(Continued)

FOREIGN PATENT DOCUMENTS

| CA | 2998175 A1 * | 9/2013 | ............. G01S 17/58 |
| JP | 2005291788 A * | 10/2005 | ........... G01S 17/936 |

OTHER PUBLICATIONS

Fuerstenberg et al., Object Tracking and Classification for Multiple Active Safety and Comfort Applications using a Multilayer Laserscanner, Jun. 14-17, 2004, 2004 IEEE Intelligent Vehicles Symposium Parma, Italy, pp. 802-807 (Year: 2004).*

(Continued)

*Primary Examiner* — Mischita L Henson
(74) *Attorney, Agent, or Firm* — Fish & Richardson P.C.

(57) ABSTRACT

A vehicle identification system configured to identify a type of a target vehicle includes a first reflector configured to be disposed on an outer surface of the target vehicle, a second reflector configured to be disposed on the outer surface of the target vehicle and spaced apart from the first reflector, and a vehicle identification apparatus configured to identify the type of the target vehicle based on light reflected by the (Continued)

first reflector and the second reflector. The vehicle identification apparatus includes: a laser sensor configured to emit light toward the target vehicle and detect a first reflected light reflected by the first reflector and a second reflected light reflected by the second reflector, and a processor configured to identify the type of the target vehicle based on an intensity of each of the first reflected light and the second reflected light.

19 Claims, 9 Drawing Sheets

(56) References Cited

U.S. PATENT DOCUMENTS

2012/0062372 A1* 3/2012 Augst .................... G08G 1/165
                                                                                340/435
2020/0005646 A1* 1/2020 Wong .................. G06V 20/584

OTHER PUBLICATIONS

Cho et al., Vehicle detection and classification in the Scala sensor by using binary classification, Oct. 13-16, 2015, 2015 15th International Conference on Control, Automation and Systems (ICCAS 2015), IEEE Xplore, pp. 2022-2025 (Year: 2015).*
Toshihiro Tsumura, "Optical two-way vehicle-to-vehicle communication by the use of laser and corner cube," Robotics and Autonomous System, Apr. 1996, 2 pages (Abstract only).
Korean Notice of Allowance in Korean Appln. No. 10-2019-0082346, dated Jun. 22, 2020, 6 pages (with English translation).

* cited by examiner

TABLE 1

| CLASSIFICATION | FIRST REFLECTOR | SECOND REFLECTOR | TYPE |
|---|---|---|---|
| 1 | r1 | r1 | COMPACT VEHICLE |
| 2 | r1 | r2 | MEDIUM-SIZED VEHICLE |
| 3 | r2 | r1 | LARGE-SIZED VEHICLE |

FIG. 5

TABLE 2

| CLASSIFICATION | DATA | TYPE |
|---|---|---|
| 1 | (0,0) | COMPACT VEHICLE |
| 2 | (0,1) | MEDIUM-SIZED VEHICLE |
| 3 | (1,0) | LARGE-SIZED VEHICLE |
| 4 | (1,1) | BUSINESS VEHICLE |

FIG. 6

TABLE 3

| CLASSIFICATION | DATA | DATA |
|---|---|---|
| 1 | (L,L) | LOADED VEHICLE |
| 2 | (L,M) | BUS |
| 3 | (L,H) | GOODS DELIVERING VEHICLE |
| 4 | (M,L) | TAXI |
| 5 | (M,M) | ELECTRIC VEHICLE |
| 6 | (M,H) | HANDICAPPED VEHICLE |
| 7 | (H,L) | AMBULANCE |
| 8 | (H,M) | FIRE ENGINE |
| 9 | (H,H) | POLICE VEHICLE |

FIG. 7

SYSTEM FOR IDENTIFYING VEHICLE USING LASER SENSOR

CROSS-REFERENCE TO RELATED APPLICATION

The present disclosure claims priority to and the benefit of Korean Patent Application No. 10-2019-0082346, filed on Jul. 8, 2019, the disclosure of which is incorporated herein by reference in its entirety.

TECHNICAL FIELD

The present disclosure relates to a vehicle identification system that emits light to a vehicle having a plurality of reflectors and identifies a type of the vehicle based on an intensity of light reflected by the plurality of reflectors.

BACKGROUND

Autonomous vehicles may recognize a nearby vehicle on the road by various types of sensors provided in the vehicle.

For example, an autonomous vehicle may include an ultrasonic sensor, an infrared sensor, a radio detecting and ranging (RADAR), a light detection and ranging (LiDAR), and a camera sensor to identify an obstacle near the vehicle through the sensor.

In some cases, while the autonomous vehicle may recognize the obstacle near the vehicle, the autonomous vehicle may not determine whether the obstacle is a vehicle, and in particular, properties (for example, sizes, types, and usage) of the vehicle.

SUMMARY

The present disclosure describes a laser device configured to emit laser light to a vehicle having a plurality of reflectors and to identify a type of vehicle based on an intensity of laser reflected by each of the plurality of reflectors.

The present disclosure also provides a plurality of transparent reflectors.

For example, the type of the vehicle may be identified by comparing an intensity of the laser reflected by the reflector provided in a target vehicle and a magnitude of a reference laser reflected by a reference reflector provided in the target vehicle.

The objects of the present disclosure are not limited to the above-mentioned objects, and other objects and advantages of the present disclosure which are not mentioned may be understood by the following description and more clearly understood by the implementations of the present disclosure. It will also be readily apparent that the objects and the advantages of the present disclosure may be implemented by features defined in claims and a combination thereof.

According to one aspect of the subject matter described in this application, a vehicle identification system is configured to identify a type of a target vehicle and includes a first reflector configured to be disposed on an outer surface of the target vehicle, a second reflector configured to be disposed on the outer surface of the target vehicle and spaced apart from the first reflector, and a vehicle identification apparatus configured to identify the type of the target vehicle based on light reflected by the first reflector and the second reflector. The vehicle identification apparatus includes: a laser sensor configured to emit light toward the target vehicle and detect a first reflected light reflected by the first reflector and a second reflected light reflected by the second reflector, and a processor configured to identify the type of the target vehicle based on an intensity of each of the first reflected light and the second reflected light.

Implementations according to this aspect may include one or more of the following features. For example, the first reflector and the second reflector may be configured to be disposed on one of a front surface of the target vehicle or a rear surface of the target vehicle. In some examples, the first reflector may be configured to be disposed at a first side of the one of the front surface or the rear surface of the target vehicle, and the second reflector may be configured to be disposed at a second side of the one of the front surface or the rear surface of the target vehicle.

In some implementations, each of the first reflector and the second reflector may be configured to transmit visible light having a wavelength in a visible light region and reflect infrared light having a wavelength in an infrared light region. In some examples, each of the first reflector and the second reflector may be configured to be set to a reflectivity among a plurality of preset reference reflectivities that are different from one another.

In some implementations, the processor may be configured to: compare the intensity of the first reflected light to the intensity of the second reflected light; and identify the type of the target vehicle based on a result of the comparison of the intensity of the first reflected light to the intensity of the second reflected light. In some implementations, the processor may be configured to generate binary data that represent the intensity of each of the first reflected light and the second reflected light, and identify the type of the target vehicle based on the binary data.

In some implementations, the vehicle identification system may further include a reference reflector configured to be disposed on the outer surface of the target vehicle. The laser sensor may be configured to detect a reference light reflected by the reference reflector, and the processor may be configured to: compare the intensity of each of the first reflected light and the second reflected light to a reference intensity of the reference light; and identify the type of the target vehicle based on a result of the comparison of the intensity of each of the first reflected light and the second reflected light to the reference intensity of the reference light.

In some implementations, the processor may be configured to: generate binary data that represent the intensity of each of the first reflected light and the second reflected light relative to the reference intensity of the reference light; and identify the type of the target vehicle based on the binary data. In some implementations, the processor may be configured to: compare the intensity of each of the first reflected light and the second reflected light to a reference intensity range; and identify the type of the target vehicle based on a result of the comparison of the intensity of each of the first reflected light and the second reflected light to the reference intensity range.

In some implementations, the first reflector and the second reflector may be provided to the target vehicle as a first pair of reflectors that are configured to be disposed on one of a front surface or a rear surface of the target vehicle. The system may further include a second pair of reflectors comprising a third reflector and a fourth reflector that are configured to be disposed on a side surface of the target vehicle. The laser sensor may be configured to detect a third reflected light reflected by the third reflector and a fourth reflected light reflected by the fourth reflector, and the processor may be configured to identify the type of the target vehicle based on a first intensity of light reflected by the first pair of reflectors or a second intensity of light reflected by the second pair of reflectors.

In some implementations, wherein the processor may be configured to: based on the first intensity being greater than the second intensity, identify the type of the target vehicle based on the first intensity; and based on the second intensity being greater than the first intensity, identify the type of the target vehicle based on the second intensity. In some implementations, the processor may be configured to: identify a first type of the target vehicle based on the first intensity of the first pair of reflectors; identify a second type of the target vehicle based on the second intensity of the second pair of reflectors; determine whether the first type matches the second type; and based on a determination that the first type does not match the second type, determine one of the first type or the second type as the type of the target vehicle.

In some implementations, the processor may be configured to: based on the first intensity being greater than the second intensity, determine the first type as the type of the target vehicle; and based on the second intensity being greater than the first intensity, determine the second type as the type of the target vehicle. In some examples, each of the first reflector, the second reflector, the third reflector, and the fourth reflector may be configured to be set to a reflectivity among a plurality of preset reference reflectivities that are different from one another. In some examples, reflectivities of the second pair of reflectors may be set to be equal to reflectivities of the first pair of reflectors.

In some implementations, the type of the target vehicle may represent at least one of a size of the target vehicle, a usage of the target vehicle, or a power source of the target vehicle, or a user of the target vehicle. In some implementations, the vehicle identification apparatus may be configured to be disposed at a vehicle. The vehicle identification apparatus may be configured to identify the type of the target vehicle based on the vehicle being driven within a range from the target vehicle.

According to another aspect, a vehicle includes a power source configured to drive the vehicle, and a vehicle identification apparatus configured to identify a type of a target vehicle disposed within a range from the vehicle. The vehicle identification apparatus includes: a laser sensor configured to emit light toward the target vehicle and detect a first reflected light reflected by a first reflector disposed on an outer surface of the target vehicle and a second reflected light reflected by a second reflector disposed on the outer surface of the target vehicle and spaced apart from the first reflector, and a processor configured to identify the type of the target vehicle based on an intensity of each of the first reflected light and the second reflected light.

Implementations according to this aspect may include one or more of the features described above with respect to the vehicle identification system.

In some implementations, the laser may be emitted to the vehicle having the plurality of reflectors and the type of vehicle may be identified based on the intensity of the laser reflected by the plurality of reflectors, to determine properties such as sizes, types, and use of the nearby vehicle and form an environment in which the autonomous vehicle may travel in consideration of properties of the nearby vehicle.

In some implementations, the plurality of transparent reflectors may be made of a transparent material such that aesthetics of the vehicle may not be degraded.

In some implementations, it may be possible to identify the type of vehicle by comparing the intensity of laser reflected by the reflector provided in the target vehicle and a magnitude of a reference laser reflected by the reference reflector provided in the target vehicle, thereby accurately identifying the property of the vehicle regardless of changes in an external environment that affect a laser receiving rate.

In some examples, where an autonomous vehicle may determine the properties of the nearby vehicle, the autonomous vehicle may travel based on various types of traveling algorithms made in consideration of the properties of the nearby vehicle. For example, when the autonomous vehicle may recognize that the nearby vehicle is an ambulance, the autonomous vehicle may travel based on a traveling algorithm that allows the ambulance to open a road so that the ambulance may be rapidly arrived at scene of an accident.

A specific effect of the present disclosure, in addition to the above-mentioned effect, will be described together while describing specific matters to implement the present disclosure.

DETAILED DESCRIPTION

The above-mentioned objects, features, and advantages of the present disclosure will be described in detail with reference to the accompanying drawings. Accordingly, the skilled person in the art to which the present disclosure pertains may easily implement the technical idea of the present disclosure. In the description of the present disclosure, if it is determined that a detailed description of a well-known relevant technology of the present disclosure may unnecessarily obscure the gist of the present disclosure, the detailed description thereof is omitted. One or more implementations of the present disclosure are described in detail with reference to the accompanying drawings. In the drawings, same reference numerals are used to refer to same or similar components.

The present disclosure relates to a vehicle identification system that emits a laser to a vehicle having a plurality of reflectors and identifies types of vehicles based on an intensity of the laser reflected by the plurality of reflectors.

A vehicle identification system and a vehicle identification apparatus will be described in detail with reference to the drawings. In some implementations, a target vehicle may be included in the vehicle identification system. In some implementations, a portion of the target vehicle (e.g., one or more reflectors) may be included in the vehicle identification system.

Figure 1:
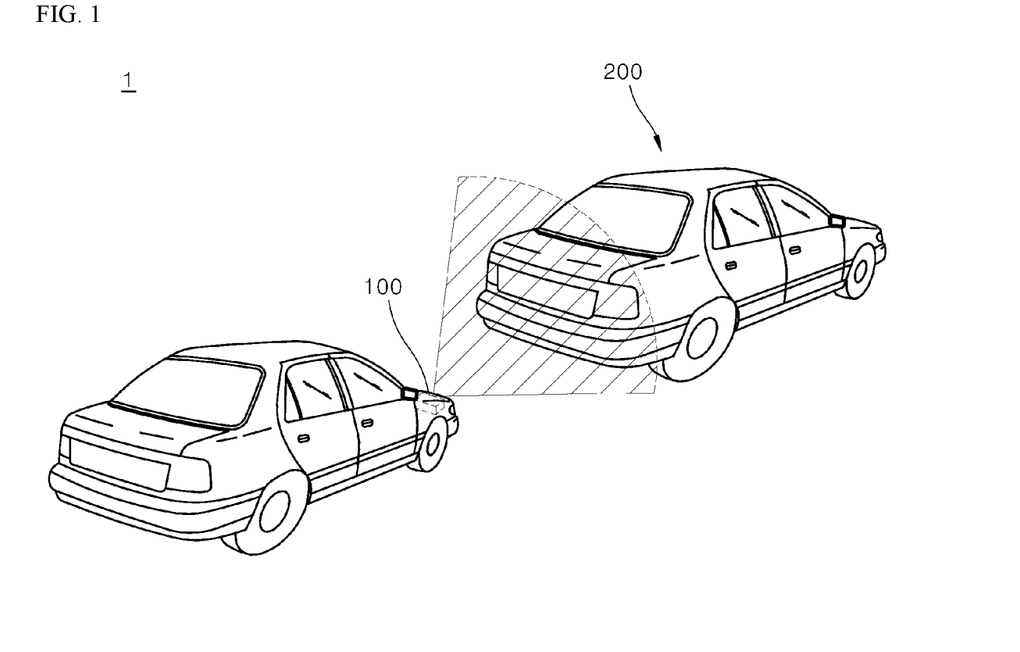
FIG. 1 shows an example of a vehicle identification system.
Figure 2:
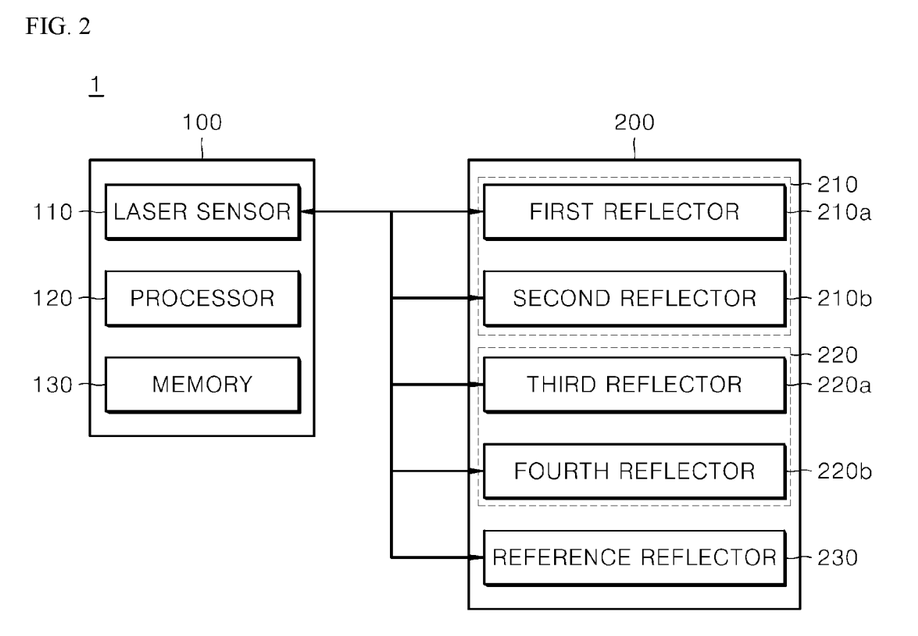
FIG. 2 is a block diagram showing an example of an internal configuration of the vehicle identification apparatus and a target vehicle shown in FIG. 1.

FIG. 1 illustrates an example of a vehicle identification system, and FIG. 2 is a block diagram showing an example of internal configurations of the vehicle identification apparatus and a target vehicle shown in FIG. 1.

Figure 3A:
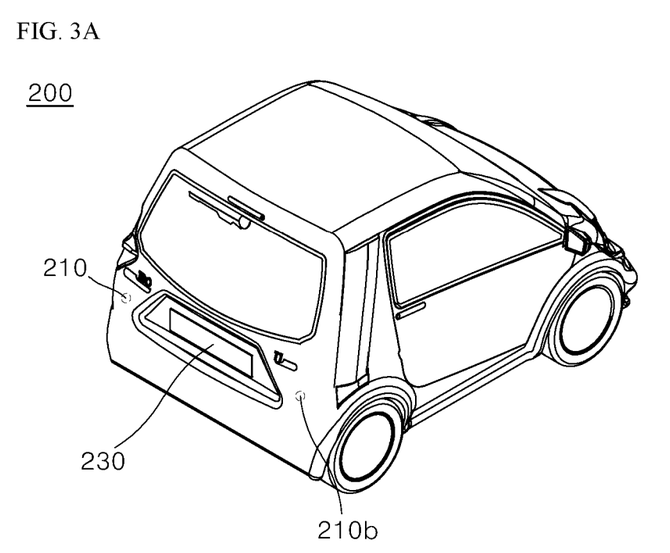
FIGS. 3A to 3C show example vehicles having different sizes and example reflectors disposed on the vehicles.
Figure 3B:
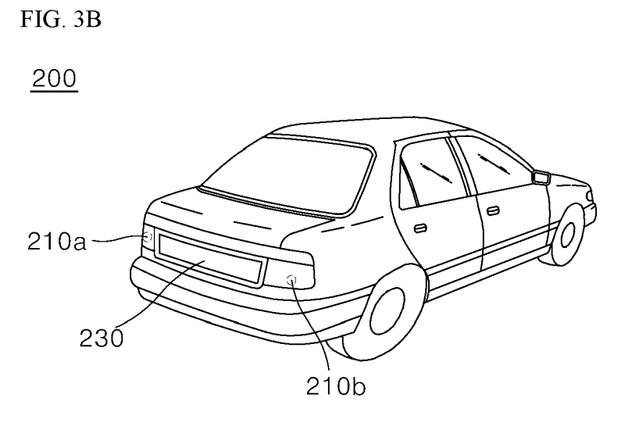
Figure 3C:
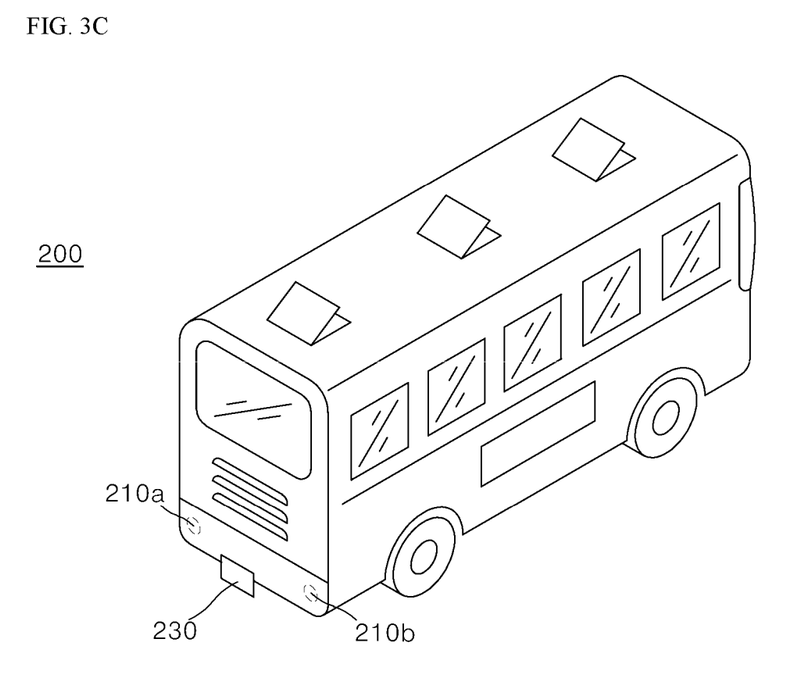

FIGS. 3A to 3C show example reflectors provided to vehicles having different sizes, respectively.

Figure 4:
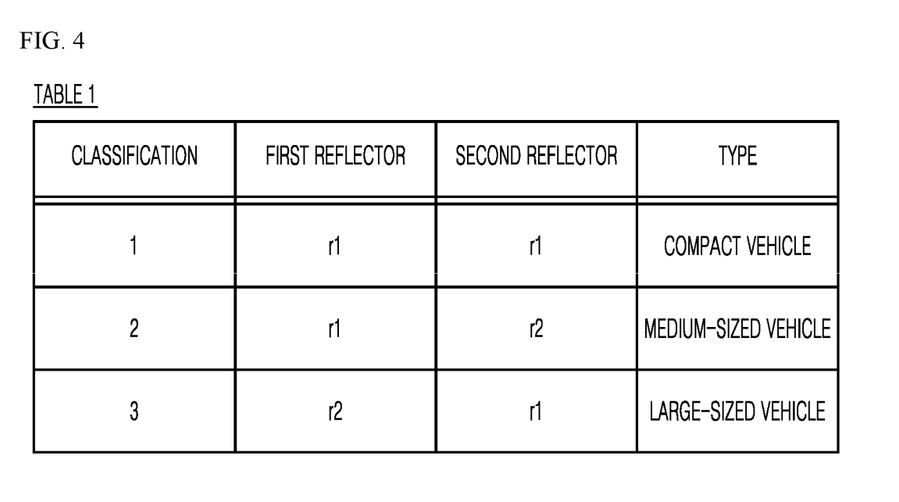
FIG. 4 shows a table that includes example types of vehicles corresponding to reflectivity of each reflector.
Figure 5:
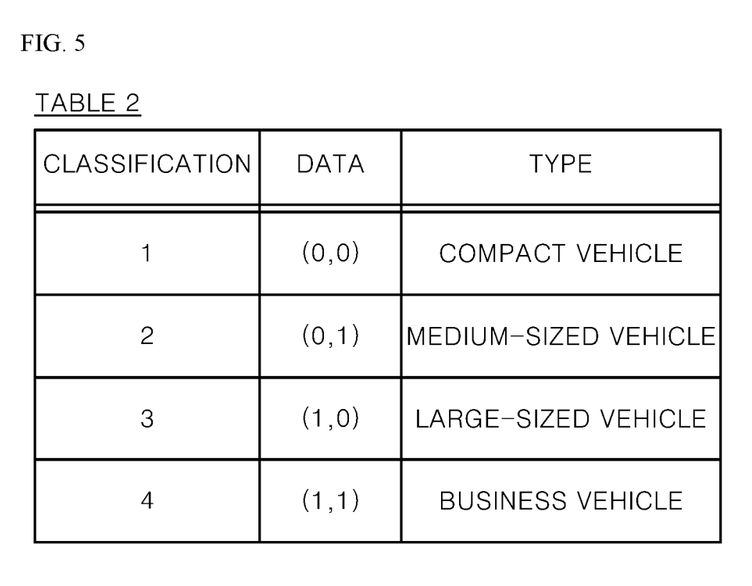
FIG. 5 shows a table that includes example types of vehicles corresponding to binary data.
Figure 6:
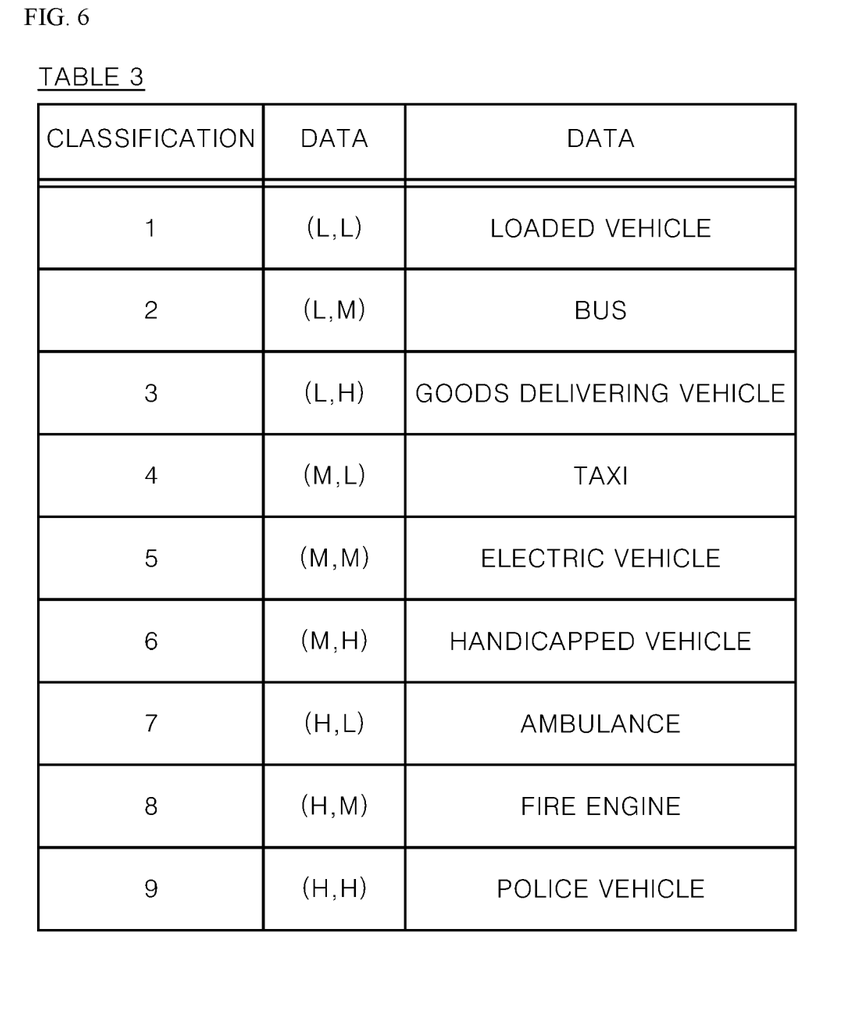
FIG. 6 shows a table that includes example types of vehicles corresponding to normalized data based on a reference range.

FIG. 4 shows a table that includes example types of vehicles corresponding to reflectivity of each reflector, and FIG. 5 shows a table that includes example types of vehicles corresponding to binary data, and FIG. 6 shows a table that includes example types of vehicles corresponding to data normalized based on a reference range.

Figure 7:
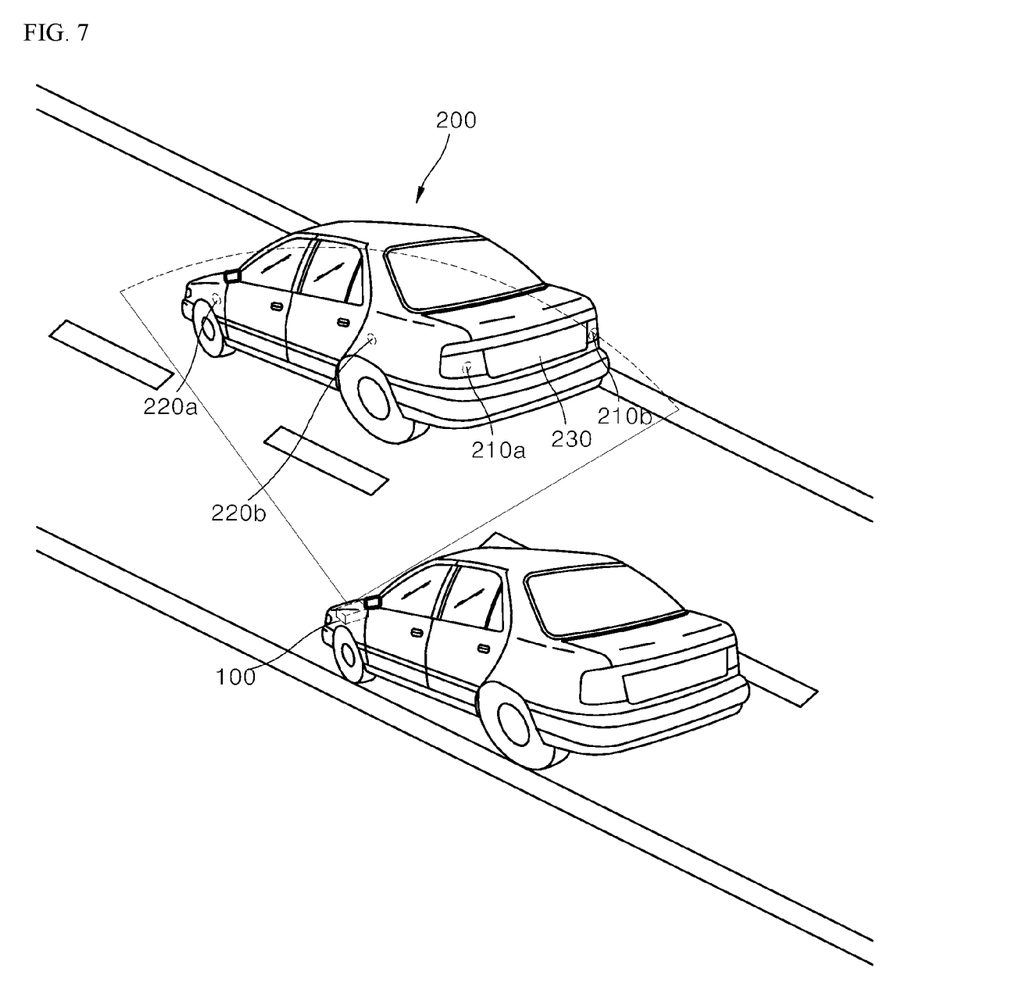
FIG. 7 shows an example of a laser sensor that detects light reflected by two pairs of reflectors disposed on a target vehicle.

FIG. 7 shows an example of a laser sensor that detects lasers reflected by two pairs of reflectors provided to a target vehicle.

Referring to FIG. 1, a vehicle identification system 1 may include a vehicle identification apparatus 100 and a target vehicle 200. In some implementations, only a portion of the target vehicle (e.g., one or more reflectors) may be included in the vehicle identification system 1.

The vehicle identification apparatus 100 may be fixedly installed on a road or a roadside to identify the target vehicle 200 or may be mounted on the vehicle to identify the target vehicle 200 as shown in FIG. 1.

The vehicle on which the vehicle identification apparatus 100 is mounted may be any type of vehicle, and may include the above-described target vehicle 200. Accordingly, the vehicle identification apparatus 100 may be mounted on the target vehicle 200, and the vehicle identification apparatus 100 may perform operation to identify the other target vehicles 200. For convenience of description, it is described below that the vehicle on which the vehicle identification apparatus 100 is mounted is referred to as "a vehicle of a user," and the vehicle identified by the vehicle identification apparatus 100 is referred to as "a target vehicle 200."

In some implementations, a vehicle may include an internal combustion engine vehicle having an engine which functions as a power source, a hybrid vehicle having an engine and an electric motor which function as power sources, an electronic vehicle having an electric motor as a power source, and a fuel cell electric vehicle having fuel cell which functions as a power source. The power source may drive the vehicle and supply power to one or more components of the vehicle such as electronic devices connected to the vehicle (e.g., the vehicle identification apparatus 100). In some implementations, the vehicle identification apparatus 100 may include a separate power source (e.g., a battery) that is different from the power source of the vehicle.

In some implementations, the vehicle may be an autonomous vehicle that may travel to the destination of the autonomous vehicle by itself without operation of the user. In some cases, the autonomous vehicle may be closely connected with any artificial intelligence (AI) module, a drone, an unmanned aerial vehicle, a robot, an augmented reality (AR) module, a virtual reality (VR) module, a $5^{th}$ generation (5G) mobile communication apparatus, and the like.

Referring to FIG. 2, the vehicle identification apparatus 100 may include a laser sensor 110, a processor 120, and a memory 130. Further, the target vehicle 200 may include a first pair of reflectors 210 including the first reflector 210a and the second reflector 210b, a second pair of reflectors 220 including a third reflector 220a and a fourth reflector 220b, and a reference reflector 230.

The vehicle identification apparatus 100 and the target vehicle 200 shown in FIG. 2 are according to one implementation, and components thereof are not limited to the implementation shown in FIG. 2, and some components thereof may be added, changed, or deleted. For example, the target vehicle 200 may include any one of the first pair of reflectors 210 or the second pair of reflectors 220. In some cases, the target vehicle 200 may not include the reference reflector 230.

FIG. 2 shows only example components to explain the present disclosure, and a plurality of components required for travelling may be further included in the target vehicle 200, in addition to the components shown in FIG. 2.

A first pair of reflectors, for example, a first reflector 210a and a second reflector 210b may be provided to the target vehicle 200. The first reflector 210a and the second reflector 210b may be disposed on an outer surface of the target vehicle 200 and may be spaced apart from each other.

In some implementations, the first reflector 210a and the second reflector 210b may be vertically or horizontally spaced from each other on at least one of a front surface, both sides, and a rear surface of the target vehicle 200. For example, the first reflector 210a and the second reflector 210b may be vertically spaced apart from each other on a pillar provided at a side of the target vehicle 200. Further, the first reflector 210a and the second reflector 210b may be horizontally spaced apart from each other on a bumper disposed on the rear surface of the target vehicle 200.

In some implementations, as described below, the laser sensor 110 may determine which reflector among the first reflector 210a and the second reflector 210b reflected the corresponding laser based on an incidence angle of laser. In some implementations, the first reflector 210a and the second reflector 210b may be spaced apart from each other on the outer surface of the vehicle by a preset distance or more.

For example, the first reflector 210a may be provided at one side of the rear surface of the target vehicle 200. The second reflector 210b may be provided at the other side of the rear surface of the target vehicle 200. In some examples, where the first reflector 210a and the second reflector 210b are disposed on the bumper at the rear side of the vehicle, the first reflector 210a may be provided at a left end of the bumper and the second reflector 210b may be provided at a right end of the bumper.

In another example, the first reflector 210a may be provided at the upper end of the side surface of the target vehicle 200. The second reflector 210b may be provided at the lower end of the side surface of the target vehicle 200. In some examples, where the first reflector 210a and the second reflector 210b are disposed on the filler on the side of the vehicle, the first reflector 210a may be provided at the upper end of the pillar and the second reflector 210b may be provided at the lower end of the filler.

The first reflector 210a and the second reflector 210b may be spaced apart from each other on any outer surface of the vehicle, in addition to the above-described examples. As shown in FIG. 1, the vehicle identification apparatus 100 may be mounted on the vehicle of the user, traveling on the same road as the target vehicle 200, where the first reflector 210a and the second reflector 210b may be disposed on the rear surface of the target vehicle 200. It is assumed below that the first pair of reflectors, for example, the first reflector 210a and the second reflector 210b are fixed on the rear surface of the target vehicle 200.

The vehicle identification apparatus 100 may include a laser sensor 110 that emits and detects light (e.g., laser light) and a processor 120 that identifies the type of the target vehicle 200 based on the detection result obtained by the laser sensor 110. In some implementations, the type of the target vehicle 200 may relate to the properties of the target vehicle 200, and any property that may specify the vehicle, for example, types, sizes, and usages of the target vehicle 200.

The laser sensor 110 may emit a laser and detect the lasers reflected by the above-mentioned first reflector 210a and second reflectors 210b, respectively.

Referring back to FIG. 1, the laser sensor 110 may emit the laser in a preset direction. The laser sensor 110 may be fixed to the outer surface of the vehicle of the user to emit the laser only in a specific direction, or may be rotatably fixed to the outer surface of the vehicle of the user to emit the laser in a range of an angle. For example, the laser sensor 110 may emit light in any of 45 degree, 90 degree, 120 degree, 360 degree directions. In some cases, the laser sensor 110 may emit light to scan a range of an area.

The laser sensor 110 may further include a diffusion lens, and may emit the laser through the diffusion lens. For instance, as shown in FIG. 1, the laser may be diffused in a fan shape.

In some implementations, the laser sensor 110 may be implemented with a radio detecting and ranging (RADAR) device that emits and detects microwave as a laser, and with a light detection and ranging (LiDAR) device that emits and detects a light (for example, a laser pulse) as a laser. Further, the laser sensor 110 may be implemented with various types of sensors that emit and detect the laser having any wavelength. In some examples, the laser may refer to a detection light emitted by the laser sensor 110.

As described above, the diffused laser may be reflected by the first reflector 210a and the second reflector 210b, and the reflected laser may be received at the laser sensor 110 again. In some examples, the first reflector 210a and the second reflector 210b may be made of a material capable of reflecting a laser. For example, when the laser sensor 110 is implemented with the RADAR or the LiDAR as described above, the first reflector 210a and the second reflector 210b may be made of a material capable of reflecting microwaves or infrared rays.

In some implementations, as the first reflector 210a and the second reflector 210b are disposed on the outer surface of the target vehicle 200, the second reflector 210b in addition to the first reflector 210a each may be made of a transparent material not to degrade aesthetics of the vehicle itself.

In some implementations, the first reflector 210a and the second reflector 210b may be made of a material that transmits the light in a visible light region and reflects the light in an infrared region. For example, the first reflector 210a and the second reflector 210b have very low reflectivity and high transmission in a region in which wavelength is less than about 780 nm and the first reflector 210a and the second reflector 210b may be made of a material that has low transmission and high reflectivity in a region in which the wavelength is about 780 nm or more.

Accordingly, the first reflector 210a and the second reflector 210b, which are fixed to the outer surface of the vehicle, reflect the lasers, respectively, but the shapes thereof may not be visually recognized.

As described above, the present disclosure provides a plurality of transparent reflectors, so that the aesthetics of the vehicle itself may not be degraded when the operation is performed to determine the properties of the nearby vehicle.

The laser sensor 110 may receive the lasers reflected by the first reflector 210a and the second reflector 210b and may detect the intensities of the lasers.

The processor 120 may receive the detection result from the laser sensor 110 and may identify the type of the target vehicle 200 based on the intensity of each laser detected by the laser sensor 110.

More specifically, the processor 120 may normalize the intensity of the laser reflected by the first reflector 210a and the intensity of the laser reflected by the second reflector 210b and may identify the type of the target vehicle 200 based on the above.

In some implementations, the first reflector 210a and the second reflector 210b may be set to have any one of a plurality of preset reference reflectivities that are different from one another.

The reference reflectivity may be set in advance according to design needs. For example, the reference reflectivity may be divided into a first reference reflectivity having a relatively less reflectivity and a second reference reflectivity having a relatively grater reflectivity. In some examples, the first reflector 210a and the second reflector 210b may be designed in advance to have any one of the first reference reflectivity and the second reference reflectivity and may be disposed on the outer surface of the vehicle.

The processor 120 may compare the intensity of each laser detected by the laser sensor 110 and may identify the type of the target vehicle 200 based on the comparison result.

In some implementations, as described below, the first reflector 210a and the second reflector 210b may have a first reference reflectivity or a second reference reflectivity greater than the first reference reflectivity. In some examples, the first reflector 210a may have the first reference reflectivity, and the second reflector 210b may have the second reflectively. In some examples, the first reflector 210a may have the second reference reflectivity, and the second reflector 210b may have the first reflectively. In some cases, both of the first reflector 210a and the second reflector 210b may have one of the first reference reflectivity or the second reference.

First, referring to FIG. 3A, a first reflector 210a and a second reflector 210b included in a compact vehicle may have a first reference reflectivity. Next, referring to FIG. 3B, a first reflector 210a and a second reflector 210b provided in a middle-sized vehicle may have a first reference reflectivity and a second reference reflectivity, respectively. Finally, referring to FIG. 3C, a first reflector 210a and a second reflector 210b provided in a large-sized vehicle may have a second reference reflectivity and a first reference reflectivity, respectively.

The reflectivities of the first reflector 210a and the second reflector 210b may be preset based on the size of the vehicle and may be stored in the memory 130. For example, when the compact vehicle is produced, a first reflector 210a and a second reflector 210b having a specific reflectivity may be installed on the outer surface of the compact vehicle. When the vehicle is compact, the specific reflectivity of the first reflector 210a and the second reflector 210b may be stored in advance in the memory 130.

As described above, as the first reflector and the second reflector 210b are fixed at predetermined positions of the vehicle, the laser sensor 110 may detect the intensity of the laser beam reflected by the first reflector 210a, and the intensity of the laser reflected by the second reflector 210b, respectively, based on the incidence angle of the laser.

The laser sensor 110 may provide information on the detected intensity of each laser to the processor 120 and the processor 120 may identify the type of the target vehicle 200 based on the intensity of each laser.

Referring to Table 1 shown in FIG. 4, a type of vehicle corresponding to reflectivity of each of a first reflector 210a and a second reflector 210b may be stored in advance, in the memory 130, in a form of look-up table (LUT).

A processor 120 may calculate the reflectivity based on a ratio of a transmission intensity of the laser emitted by the laser sensor 110 to a reception intensity of the laser received at the laser sensor 110. Subsequently, the processor 120 may identify the type of the vehicle corresponding to calculated reflectivity with respect to each reflector with reference to the LUT and may determine the identified type of vehicle as a type of target vehicle 200.

For example, the processor 120 may receive information on the intensity of the laser reflected by the first reflector 210a, from the laser sensor 110, and may calculate the reflectivity of the first reflector 210a as r1, which is a first reference reflectivity. Further, the processor 120 may receive the intensity of the laser reflected by the second reflector 210b from the laser sensor 110 and may calculate the reflectivity of the second reflector 210b as r1 as the first reference reflectivity. In some examples, the processor 120 may identify the type of vehicle corresponding to the reflectivity r1 of the first reflector 210a and the reflectivity r2 of the second reflector 210b as "the compact vehicle" with reference to Table 1 stored in the memory 130.

In another example, the processor 120 may calculate the reflectivity of the first reflector 210a as r1, which is the first reference reflectivity, and may calculate the reflectivity of the second reflector 210b as r2 which is the second reference reflectivity through the above-mentioned method. In some examples, the processor 120 may identify that the type of the vehicle corresponding to the reflectivity r1 of the first reflector 210a and the reflectivity r2 of the second reflector 210b is "a medium-sized vehicle" with reference to Table 1 stored in the memory 130.

In some implementations, the processor 120 may compare intensity of each laser received from the laser sensor 110 and identify the type of the target vehicle 200 based on the comparison result.

More specifically, the processor 120 may compare the intensity of the laser reflected by the first reflector 210a with the intensity of the laser reflected by the second reflector 210b. As the laser sensor 110 transmits a predetermined intensity of laser, the greater the reflectivity, the greater the receiving intensity of the laser.

The processor 120 may determine that, when the intensity of the laser reflected by the first reflector 210 is the same as the intensity of the laser reflected by the second reflector 210b, the type of the target vehicle 200 is "the compact vehicle" with reference to Table 1. Further, the processor 120 may determine that, when the intensity of the laser reflected by the first reflector 210a is less than the intensity of the laser reflected by the second reflector 210b, the type of target vehicle 200 is "the medium-sized vehicle." Further, the processor 120 may identify the type of target vehicle 200 as "a large-sized vehicle," when the intensity of laser reflected by the first reflector 210a is greater than the intensity of laser reflected by the second reflector 210b.

In some implementations, the processor 120 may generate binary data by binary-coding the intensity of each of lasers received from the laser sensor 110 and may identify the type of vehicle corresponding to the binary data as the type of target vehicle 200.

As described above, the reflectivity of each of first reflector 210a and second reflector 210b may be any one of the first reference reflectivity and second reference reflectivity. The intensity of the laser reflected by the reflectors 210a may be different from the intensity of the laser reflected by the reflector 210b based on the reflectivity of the first reflector 210a and the reflectivity of the second reflector 210b, and the processor 120 may compare the intensities of reflected lasers and may generate the binary data.

For example, the processor 120 may have "1" of greater intensity of laser and may have "0" of less intensity of laser, among the intensity of laser reflected by the first reflector 210a and the intensity of laser reflected by the second reflector 210b, and the intensity of the laser may be binary-coded.

Referring to Table 2 shown in FIG. 5, when intensity of a laser reflected by a first reflector 210a is less than an intensity of a laser reflected by a second reflector 210b, a processor 120 may generate binary data of (0, 1). In some examples, the processor 120 may identify a type of target vehicle 200 as "a medium-sized vehicle" corresponding to binary data.

To the contrary, when the intensity of the laser reflected by the first reflector 210a is greater than the intensity of the laser reflected by the second reflector 210b, the processor 120 may generate binary data of (1, 0). In some examples, the processor 120 may identify the type of target vehicle 200 as a "large-sized vehicle" corresponding to the binary data.

However, when the intensity of the laser reflected by the first reflector 210a is the same as the intensity of the laser reflected by the second reflector 210b, the processor 120 may not generate the binary data based on magnitude of the intensities of lasers.

In this case, the processor 120 may calculate the reflectivity based on operation of calculating reflectivity described above, and may compare the calculated reflectivity with a reference reflectivity to generate the binary data. The reference reflectivity may be set in advance between the above-mentioned first reference reflectivity and second reference reflectivity and may be stored in advance in the memory 130. For example, the reference reflectivity may be set in advance as average reflectivity of the first reference reflectivity and the second reference reflectivity.

For example, when the reflectivity calculated based on the intensity of the laser reflected by each of the first reflector 210a or the second reflector 210b is greater than the reference reflectivity, the processor 120 may binary-code the intensity of laser reflected by each of reflectors 210a and 210b as "1." To the contrary, when the reflectivity calculated based on the intensity of laser reflected by the first reflector 210a or the second reflector 210b is less than the reference reflectivity, the processor 120 may binary-code the intensity of the laser reflected by each of reflectors 210a and 210b as "0."

Referring to FIGS. 4 and 5, the processor 120 may calculate the reflectivities of the first reflector 210a and the second reflector 210b as r1, which is the first reference reflectivity, respectively. In some examples, as the first reference reflectivity is less than the reference reflectivity stored in the memory 130, the processor 120 may generate the binary data of (0, 0), and the type of the target vehicle 200 may be identified as "the compact vehicle" corresponding to the binary data.

Further, the processor 120 may calculate the reflectivities of the first reflector 210a and the second reflector 210b as r2, which is the second reference reflectivity, respectively. In some examples, as the second reference reflectivity is greater than the reference reflectivity stored in the memory 130, the processor 120 may generate the binary data of (1, 1), and the type of the target vehicle 200 may be identified as "a business car" corresponding to the binary data.

In some examples, where the laser receiving rate is lowered due to various kinds of factors such as deterioration in weather situation, the intensity of the laser detected by the laser sensor 110 may be reduced. For example, even when the reflectivity of the first reflector 210a or the second reflector 210b is set to be a second reference reflectivity greater than the reference reflectivity, the reflectivity of each of reflectors 210a, 210b generated by the processor 120 may be lower than the reference reflectivity. Thus, the type of the target vehicle 200 to be identified as "the business car" in FIG. 5 may be incorrectly identified as "the compact vehicle."

In order to prevent the above, the target vehicle 200 may further include a reference reflector 230 on an outer surface of the vehicle. In some examples, the laser sensor 110 may detect the reference laser reflected by the reference reflector 230, and the processor 120 may identify the type of target vehicle 200 based on comparison of the intensity of laser and the intensity of reference laser reflected by the first reflector 210a and the second reflector 210b.

Like the first reflector 210a and the second reflector 210b, the reference reflector 230 may be fixedly provided at a preset position on the outer surface of the vehicle. For example, referring to FIGS. 3A to 3C, the reference reflector 230 may be disposed on a license plate installed at the rear side of the vehicle. When the reference reflector 230 is disposed on the license plate, in order to provide visibility with respect to the license plate, the reference reflector 230 may be made of material that transmits the light in the visible light region and reflects the light in the infrared region, like the above-mentioned first reflector 210a and second reflector 210b.

The reference reflector 230 may have the above-described reference reflectivity. In other words, the reflectivity of the reference reflector 230 may be preset between the first reference reflectivity and the second reference reflectivity.

As the first reflector 210a, the second reflector 210b, and the reference reflector 230 are disposed on the outer surface of the target vehicle 200, the intensity of laser which is reflected by each of reflectors 210a, 210b and 230 and detected may be lowered in an environment having a low laser receiving rate.

Accordingly, the processor 120 may perform the normalization operation by comparing the intensity of the laser reflected by the first reflector 210a and the second reflector 210b with the intensity of the reference laser reflected by the reference reflector 230 and may identify the type of the target vehicle 200 based on the normalization result.

More specifically, the processor 120 may binary-code the intensity of the laser reflected by each of the first reflector 210a and the second reflector 210b based on the intensity of the reference laser, and may identify the type of the target vehicle 200 based on the binary data.

For example, when the intensities of the lasers reflected by the first reflector 210a or the second reflector 210b are greater than the intensity of the reference laser, respectively, the processor 120 may binary-code the intensities of the lasers reflected by each of reflectors 210a and 210b as "1", respectively. To the contrary, the processor 120 may binary-code, when the intensities of the lasers reflected by the first reflector 210a or the second reflector 210b are less than the intensity of the reference laser, respectively, the intensity of the laser reflected by each of reflectors 210a and 210b as "0".

Referring back to FIG. 5, the processor 120 may generate the binary data of (0, 0) and may identify the type of the target vehicle 200 as "the compact vehicle" corresponding to the binary data, when the intensity of the laser reflected by the first reflector 210a and the intensity of the laser reflected by the second reflector 210b are less than the intensity of the reference laser, respectively.

Further, when the intensity of the laser reflected by the first reflector 210a is less than the intensity of the reference laser and the intensity of the laser reflected by the second reflector 210b is greater than the intensity of the reference laser, the processor 120 may generate the binary data of (0, 1) and may identify the type of target vehicle 200 as "the medium-sized vehicle" corresponding to the binary data.

Further, when the intensity of the laser reflected by the first reflector 210a is greater than the intensity of the reference laser and the intensity of the laser reflected by the second reflector 210b is less than the intensity of the reference raise, the processor 120 may generate the binary data of (1, 0) and may identify the type of target vehicle 200 as "the large-sized vehicle" corresponding to the binary data.

Finally, the processor 120 may generate the binary data of (1, 1) when the intensities of the lasers reflected by the first reflector 210a and the second reflector 210b are greater than the intensity of the reference laser, respectively, and it is possible to identify the type of target vehicle 200 as "the business car" corresponding to the binary data.

In some implementations, the processor 120 may compare the intensity of each laser detected by the laser sensor 110 with a reference range and may identify the type of the target vehicle 200 based on the comparison result.

Hereinafter, for convenience of explanation, it is described that the first reflector 210a and the second reflector 210b may have a first reference reflectivity or a second reference reflectivity greater than the first reference reflectivity or a third reference reflectivity greater than the second reference reflectivity.

Through the above-described method, the processor 120 may calculate the reflectivity of each of the reflectors 210a and 210b. However, the reflectivity calculated by the processor 120 may be different from the reference reflectivity set for each of the reflectors 210a and 210b due to an external environment.

To consider this error, the processor 120 may compare the intensity of each laser with a reference range and may perform normalization operation based on the comparison result.

The reference range may be a range of the reflectivity and may be divided into a first reference range to a third reference range. A median value of the first reference range may be the first reference reflectivity, and the median value of the second reference range may be the second reference reflectivity, and the median value of the third reference range may be the third reference reflectivity. For example, the first reference reflectivity to the third reference reflectivity may be preset to be 30%, 50%, and 70%, respectively. In some examples, the first reference range may be set to be 20% to 40%, and the second reference range may be set to be 40% to 60%, and the third reference range may be set to be 60% to 80%.

When the intensity of the laser reflected by each of the first reflector 210a or the second reflector 210b is less than the first reference range, the processor 120 may normalize the intensity of the laser as "LOW" (hereinafter; referred to as "L"). When the intensity of the laser reflected by each of the first reflector 210a or the second reflector 210b is less than a second reference range, the processor 120 may normalize the intensity of the laser as "MEDIUM" (hereinafter; referred to as "M"). When the intensity of the laser reflected by the first reflector 210a or the second reflector 210b is less than a third reference range, the processor 120 may normalize the intensity of the laser as "HIGH" (hereinafter; referred to as "H").

As the intensity of the laser reflected by each of the first reflector 210a and the second reflector 210b may be normalized as three kinds of intensities, the processor 120 may identify a total of nine types defined based on the normalization data.

Referring to Table 3 shown in FIG. 6, when intensities of lasers reflected by a first reflector 210 and a second reflector 210b are less than a first reference range, a processor 120 may generate normalized data of (L, L) and may identify the type of the target vehicle 200 as "a loaded vehicle" corresponding to the normalized data.

Further, when the intensity of the laser reflected by the first reflector 210a is less than the first reference range and the intensity of the laser reflected by the second reflector 210b is less than the second reference range, the processor 120 may generate the normalized data of (L, M) and may identify the type of the target vehicle 200 as "a bus" corresponding to the normalized data.

Further, when the intensity of the laser reflected by the first reflector 210a is less than the first reference range and the intensity of the laser reflected by the second reflector 210b is less than the third reference range, the processor 120 may generate the normalized data of (L, H) and may identify the type of target vehicle 200 as "a goods delivery vehicle" corresponding to the normalized data.

In this way, the processor 120 may generate normalized data of (M, L), (M, M), (M, H), (H, L), (H, M), and (H, H) and may identify the type of the target vehicle 200 as the type corresponding to the normalized data.

As described above, according to the present disclosure, the type of the vehicle may be identified by comparing the intensity of the laser reflected by the reflector provided in the target vehicle with the magnitude of the reference laser reflected by the reference reflector provided in the target vehicle, and the property of the vehicle may be accurately identified regardless of changes in the external environment that affect the laser receiving rate.

As described above, a first pair of reflectors, for example, the first reflector 210a and the second reflector 210b may be disposed on the front surface or the rear surface of the vehicle. In some examples, the target vehicle 200 may further include a third reflector 220a and a fourth reflector 220b having the same reflectivity as the first reflector 210a and the second reflector 210b. In particular, a reflectivity of the first reflector 210a may be equal to a reflectivity of the third reflector 220a, and a reflectivity of the second reflector 210b may be equal to a reflectivity of the fourth reflector 220b. The second pair of reflectors, for example, the third reflector 220a and the fourth reflector 220b may be provided at the side of the target vehicle 200.

The processor 120 may identify the type of the target vehicle 200 based on the intensity of the laser reflected by any one of the first pair of reflectors or the second pair of reflectors.

Referring to FIG. 7, a target vehicle 200 may include two pairs of reflectors, for example, a pair of reflectors 210 and a pair of reflectors 220 each of which are horizontally spaced apart from each other, respectively. More specifically, the first pair of reflectors 210 may be horizontally spaced apart from each other on the rear surface of the target vehicle 200 and the second pair of reflectors 220 may be horizontally spaced from each other at the side of the target vehicle 200.

When four lasers are received at a single target vehicle 200, the laser sensor may detect the intensity of the laser reflected by the first pair of reflectors 210 and the intensity of the laser reflected by the second pair of reflectors 220, respectively, based on the incidence angle of each laser.

The processor 120 may select any one of the first pair of reflectors and the second pair of reflectors, to be normalized, to identify the type of the target vehicle 200 and may identify the type of the target vehicle 200 based on the intensity of the laser reflected by the pair of reflectors.

More specifically, the processor 120 may identify the type of the target vehicle 200 based on the intensity of the laser reflected by the pair of reflectors whose intensity of the laser detected by the laser sensor 110 is greater, among the first pair of reflectors and second pair of reflectors.

For example, the intensity of the laser reflected by second pair of reflectors 220 may be greater than the intensity of the laser reflected by the first pair of reflectors 210 when foreign objects are present on the rear surface of the vehicle. In some examples, the processor 120 may identify the type of the target vehicle 200 based on the intensity of the laser reflected by the second pair of reflectors 220. To the contrary, when the foreign objects are present at the side of the vehicle, the processor 120 may identify the type of the target vehicle 200 based on the intensity of the laser reflected by the first pair of reflectors 210.

In some implementations, the processor 120 may identify the type of the target vehicle 200 based on the intensity of the laser reflected by each of the first pair of reflectors and the second pair of reflectors 210 and 220. For example, the first type of vehicle identified based on the intensity of the laser reflected at the first pair of reflectors 210 is different from the second type of vehicle identified based on the intensity of the laser reflected by the second pair of reflectors 220, the processor 120 may determine any one type identified based on the intensity of the laser reflected by any pair of reflectors whose intensity of the laser detected by the laser sensor 110 is greater, among the first type of vehicle and the second type of vehicle, as the type of the target vehicle 200.

Referring to FIGS. 6 and 7, the processor 120 may generate the normalized data of (H, L) based on the intensity of the laser reflected by the first pair of reflectors 210 provided in the target vehicle 200, and may identify the type of the target vehicle 200 as a "ambulance" (the first type) corresponding to the normalization data.

In some implementations, the processor 120 may generate the normalization data of (H, M) based on the intensity of the laser reflected by the second pair of reflectors 220 provided in the same target vehicle 200, and may identify the type of the target vehicle 200 as "the ambulance" (the second type) corresponding to the normalization data.

As the first type of vehicle (the ambulance) is different from the second type of vehicle (a fire engine), the processor 120 may compare the intensity of the laser reflected by the first pair of reflector and the intensity of the laser reflected by the second pair of reflectors.

Assuming that the intensities of the lasers reflected by the first reflector 210a and the second reflector 210b are the same, the intensity of the laser reflected by the second reflector 210b is in the first reference area and is normalized to "L", while the intensity of the laser reflected by the fourth reflector 220b is in the second reference area and may be normalized to "M". As the second reference area is defined as having a greater intensity than the first reference area, the processor 120 determines that the intensity of the laser reflected by the fourth reflector 220b is greater than the intensity of the laser reflected by the second reflector 210b.

Accordingly, the processor 120 may determine the second type of vehicle (e.g., the fire engine) identified based on the intensity of the laser reflected by the second pair of reflectors 220 including the fourth reflector 220b, as the type of target vehicle 200.

As described above, according to the present disclosure, the laser is emitted to the vehicle having the plurality of reflectors, and the type of the vehicle is identified based on the intensities of the lasers reflected by the plurality of reflectors, to determine the properties such as sizes, types, and uses of the nearby vehicle, and create the environment where the autonomous vehicle may travel in consideration of the properties of the nearby vehicle.

Various substitutions, modifications, and changes can be made within the scope that does not deviate from the technical idea of the present disclosure for the skilled person in the art to which the present disclosure pertains, the above-mentioned disclosure is not limited to the above-mentioned implementation and the accompanying drawings.

What is claimed is:

1. A vehicle identification system configured to identify a type of a target vehicle, the system comprising:
    a first reflector configured to be disposed on an outer surface of the target vehicle;
    a second reflector configured to be disposed on the outer surface of the target vehicle and spaced apart from the first reflector; and
    a vehicle identification apparatus configured to identify the type of the target vehicle based on light reflected by the first reflector and the second reflector,
    wherein the vehicle identification apparatus comprises:
        a laser sensor configured to emit light toward the target vehicle and detect a first reflected light reflected by the first reflector and a second reflected light reflected by the second reflector, and
        a processor configured to identify the type of the target vehicle based on an intensity of each of the first reflected light and the second reflected light, and
    wherein each of the first reflector and the second reflector is configured to be set to a reflectivity among a plurality of preset reference reflectivities that are different from one another.

2. The vehicle identification system of claim 1, wherein the first reflector and the second reflector are configured to be disposed on one of a front surface of the target vehicle or a rear surface of the target vehicle.

3. The vehicle identification system of claim 2, wherein the first reflector is configured to be disposed at a first side of the one of the front surface or the rear surface of the target vehicle, and
    wherein the second reflector is configured to be disposed at a second side of the one of the front surface or the rear surface of the target vehicle.

4. The vehicle identification system of claim 1, wherein each of the first reflector and the second reflector is configured to transmit visible light having a wavelength in a visible light region and reflect infrared light having a wavelength in an infrared light region.

5. The vehicle identification system of claim 1, wherein the processor is configured to:
    compare the intensity of the first reflected light to the intensity of the second reflected light; and
    identify the type of the target vehicle based on a result of the comparison of the intensity of the first reflected light to the intensity of the second reflected light.

6. The vehicle identification system of claim 1, wherein the processor is configured to:
    generate binary data that represent the intensity of each of the first reflected light and the second reflected light; and
    identify the type of the target vehicle based on the binary data.

7. The vehicle identification system of claim 1, further comprising a reference reflector configured to be disposed on the outer surface of the target vehicle,
    wherein the laser sensor is configured to detect a reference light reflected by the reference reflector, and
    wherein the processor is configured to:
        compare the intensity of each of the first reflected light and the second reflected light to a reference intensity of the reference light; and
        identify the type of the target vehicle based on a result of the comparison of the intensity of each of the first reflected light and the second reflected light to the reference intensity of the reference light.

8. The vehicle identification system of claim 7, wherein the processor is configured to:
    generate binary data that represent the intensity of each of the first reflected light and the second reflected light relative to the reference intensity of the reference light; and
    identify the type of the target vehicle based on the binary data.

9. The vehicle identification system of claim 1, wherein the type of the target vehicle represents at least one of a size of the target vehicle, a usage of the target vehicle, or a power source of the target vehicle, or a user of the target vehicle.

10. The vehicle identification system of claim 1, wherein the vehicle identification apparatus is configured to be disposed at a vehicle.

11. The vehicle identification system of claim 10, wherein the vehicle identification apparatus is configured to identify the type of the target vehicle based on the vehicle being driven within a range from the target vehicle.

12. A vehicle identification system of configured to identify a type of a target vehicle, the system comprising:
    a first reflector configured to be disposed on an outer surface of the target vehicle;
    a second reflector configured to be disposed on the outer surface of the target vehicle and spaced apart from the first reflector; and
    a vehicle identification apparatus configured to identify the type of the target vehicle based on light reflected by the first reflector and the second reflector,
    wherein the vehicle identification apparatus comprises:
        a laser sensor configured to emit light toward the target vehicle and detect a first reflected light reflected by the first reflector and a second reflected light reflected by the second reflector, and
        a processor configured to identify the type of the target vehicle based on an intensity of each of the first reflected light and the second reflected light, and
    wherein the processor is configured to:
        compare the intensity of each of the first reflected light and the second reflected light to a reference intensity range, and
        identify the type of the target vehicle based on a result of the comparison of the intensity of each of the first reflected light and the second reflected light to the reference intensity range.

13. A vehicle identification system configured to identify a type of a target vehicle, the system comprising:
    a first reflector configured to be disposed on an outer surface of the target vehicle;

a second reflector configured to be disposed on the outer surface of the target vehicle and spaced apart from the first reflector; and a vehicle identification apparatus configured to identify the type of the target vehicle based on light reflected by the first reflector and the second reflector, wherein the vehicle identification apparatus comprises:

a laser sensor configured to emit light toward the target vehicle and detect a first reflected light reflected by the first reflector and a second reflected light reflected by the second reflector, and a processor configured to identify the type of the target vehicle based on an intensity of each of the first reflected light and the second reflected light, wherein the first reflector and the second reflector are provided to the target vehicle as a first pair of reflectors that are configured to be disposed on one of a front surface or a rear surface of the target vehicle, wherein the system further comprises a second pair of reflectors comprising a third reflector and a fourth reflector that are configured to be disposed on a side surface of the target vehicle, wherein the laser sensor is configured to detect a third reflected light reflected by the third reflector and a fourth reflected light reflected by the fourth reflector, and wherein the processor is configured to identify the type of the target vehicle based on a first intensity of light reflected by the first pair of reflectors or a second intensity of light reflected by the second pair of reflectors.

14. The vehicle identification system of claim 13, wherein the processor is configured to:

based on the first intensity being greater than the second intensity, identify the type of the target vehicle based on the first intensity; and based on the second intensity being greater than the first intensity, identify the type of the target vehicle based on the second intensity.

15. The vehicle identification system of claim 13, wherein the processor is configured to:

identify a first type of the target vehicle based on the first intensity of the first pair of reflectors;

identify a second type of the target vehicle based on the second intensity of the second pair of reflectors;

determine whether the first type matches the second type; and based on a determination that the first type does not match the second type, determine one of the first type or the second type as the type of the target vehicle.

16. The vehicle identification system of claim 15, wherein the processor is configured to:

based on the first intensity being greater than the second intensity, determine the first type as the type of the target vehicle; and based on the second intensity being greater than the first intensity, determine the second type as the type of the target vehicle.

17. The vehicle identification system of claim 13, wherein each of the first reflector, the second reflector, the third reflector, and the fourth reflector is configured to be set to a reflectivity among a plurality of preset reference reflectivities that are different from one another.

18. The vehicle identification system of claim 17, wherein reflectivities of the second pair of reflectors are set to be equal to reflectivities of the first pair of reflectors.

19. A vehicle comprising:

a power source configured to drive the vehicle; and a vehicle identification apparatus configured to identify a type of a target vehicle disposed within a range from the vehicle, wherein the vehicle identification apparatus comprises:

a laser sensor configured to emit light toward the target vehicle and detect a first reflected light reflected by a first reflector disposed on an outer surface of the target vehicle and a second reflected light reflected by a second reflector disposed on the outer surface of the target vehicle and spaced apart from the first reflector, and a processor configured to identify the type of the target vehicle based on an intensity of each of the first reflected light and the second reflected light, and wherein the processor is configured to:

compare the intensity of each of the first reflected light and the second reflected light to a reference intensity range, and identify the type of the target vehicle based on a result of the comparison of the intensity of each of the first reflected light and the second reflected light to the reference intensity range.

* * * * *